(12) United States Patent
Yanatsubo et al.

(10) Patent No.: US 10,166,839 B2
(45) Date of Patent: Jan. 1, 2019

(54) VEHICLE DISPLAY SYSTEM RELATING TO AIR CONDITIONER OPERATING LOAD

(71) Applicant: TOYOTA JIDOSHA KABUSHIKI KAISHA, Toyota-shi, Aichi-ken (JP)

(72) Inventors: Takashi Yanatsubo, Toyota (JP); Hisashi Fujiwara, Nagoya (JP); Yosuke Nihei, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/291,410

(22) Filed: Oct. 12, 2016

(65) Prior Publication Data

US 2017/0113513 A1 Apr. 27, 2017

(30) Foreign Application Priority Data

Oct. 26, 2015 (JP) .................. 2015-210265

(51) Int. Cl.
| | |
|---|---|
| B60H 1/00 | (2006.01) |
| B60L 11/18 | (2006.01) |
| B60K 35/00 | (2006.01) |
| B60R 11/02 | (2006.01) |
| B60K 37/06 | (2006.01) |
| G06F 3/0484 | (2013.01) |
| G09G 5/00 | (2006.01) |
| B60K 31/16 | (2006.01) |
| G06F 3/0488 | (2013.01) |

(52) U.S. Cl.
CPC ......... *B60H 1/00985* (2013.01); *B60K 31/16* (2013.01); *B60K 35/00* (2013.01); *B60K 37/06* (2013.01); *B60L 11/1861* (2013.01); *B60R 11/0235* (2013.01); *G06F 3/0488* (2013.01); *G06F 3/04847* (2013.01); *G09G 5/003* (2013.01); *B60K 2350/1004* (2013.01); *B60K 2350/1032* (2013.01); *B60K 2350/1096* (2013.01); *B60K 2350/20* (2013.01); *B60K 2350/352* (2013.01)

(58) Field of Classification Search
None
See application file for complete search history.

(56) References Cited

U.S. PATENT DOCUMENTS 5,586,448 A * 12/1996 Ikeda ................ B60H 1/00392
62/156
9,649,940 B2 * 5/2017 Ryu ......................... B60L 3/12
(Continued)

FOREIGN PATENT DOCUMENTS

| JP | 2004-142714 A | 5/2004 |
|---|---|---|
| JP | 2011-113345 A | 6/2011 |
| JP | 2013-220715 A | 10/2013 |

*Primary Examiner* — Joni Richer
(74) *Attorney, Agent, or Firm* — Oliff PLC

(57) ABSTRACT

A vehicle display system includes: a display arranged in a cabin of a vehicle and configured to display settings of a plurality of setting items of an air conditioner; and an electronic control unit configured to calculate an index value indicating a level of an operating load of the air conditioner on the basis of the setting of the setting item that influences a load state of the air conditioner among the plurality of setting items, and display, on the display unit, the index value and the setting of the setting item used to calculate the index value among the plurality of setting items.

5 Claims, 7 Drawing Sheets

(56) References Cited

U.S. PATENT DOCUMENTS

| | | | |
|---|---|---|---|
| 2007/0115205 A1* | 5/2007 | Uchiyama | G02B 26/0816 345/7 |
| 2011/0130921 A1 | 6/2011 | Ono et al. | |
| 2012/0074674 A1* | 3/2012 | Ohoka | B60R 11/0235 280/728.3 |
| 2012/0098518 A1* | 4/2012 | Unagami | G01R 22/066 324/74 |
| 2012/0197828 A1* | 8/2012 | Yi | H05K 7/20836 706/12 |
| 2015/0193239 A1* | 7/2015 | Dolph | G06F 1/3212 713/100 |

* cited by examiner

VEHICLE DISPLAY SYSTEM RELATING TO AIR CONDITIONER OPERATING LOAD

INCORPORATION BY REFERENCE

The disclosure of Japanese Patent Application No. 2015-210265 filed on Oct. 26, 2015 including the specification, drawings and abstract is incorporated herein by reference in its entirety.

BACKGROUND

1. Field of the Disclosure

The disclosure relates to a vehicle display system that displays settings of an air conditioner mounted on a vehicle.

2. Description of Related Art

There is known an in-vehicle display system that displays settings of an air conditioner mounted on a vehicle (for example, Japanese Patent Application Publication No. 2011-113345 (JP 20011-113345 A), and the like).

SUMMARY

Incidentally, a user (particularly, an environment-conscious user) of a vehicle may desire to cause an air conditioner to operate at the lowest load (lowest energy consumption rate). In such a case, the user needs to adjust various settings (set temperature, air volume, and the like) such that the operating load (energy consumption rate) of the air conditioner decreases as much as possible.

However, if the settings of the air conditioner are just merely displayed, the user does not see how much the operating load of the air conditioner is reduced by changing various settings of the air conditioner. In addition, setting items include an item that influences a load state of the air conditioner and a setting item that does not influence the load state (including a setting item that almost does not influence the load state), so the user does not see which setting item contributes to a reduction of the operating load. For this reason, there is a possibility that the user is not allowed to appropriately adjust settings for causing the air conditioner to operate at a lower load.

The disclosure provides a vehicle display system that prompts a user to appropriately adjust settings for causing an air conditioner to operate at a lower load.

A first aspect of the disclosure is a vehicle display system including: a display unit arranged in a cabin of a vehicle and configured to display settings of a plurality of setting items of an air conditioner; an index value calculation unit configured to calculate an index value indicating a level of an operating load of the air conditioner on the basis of the setting of the setting item that influences a load state of the air conditioner among the plurality of setting items; and a display control unit configured to display, on the display unit, the index value calculated by the index value calculation unit and the setting of the setting item that the index value calculation unit uses to calculate the index value among the plurality of setting items.

According to the above aspect, the index value that indicates the level of the operating load of the air conditioner is displayed on the display unit, so a user (an occupant of the vehicle) is allowed to recognize how much the operating load of the air conditioner can be reduced by changing the settings of the setting items. The setting of the setting item that is used to calculate the index value among the plurality of setting items is displayed on the display unit together with the index value, so the user is allowed to recognize which setting item contributes to a reduction of the operating load. Therefore, it is possible to prompt the user to appropriately adjust settings for causing the air conditioner to operate at a lower load.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to the accompanying drawings.

Figure 1:
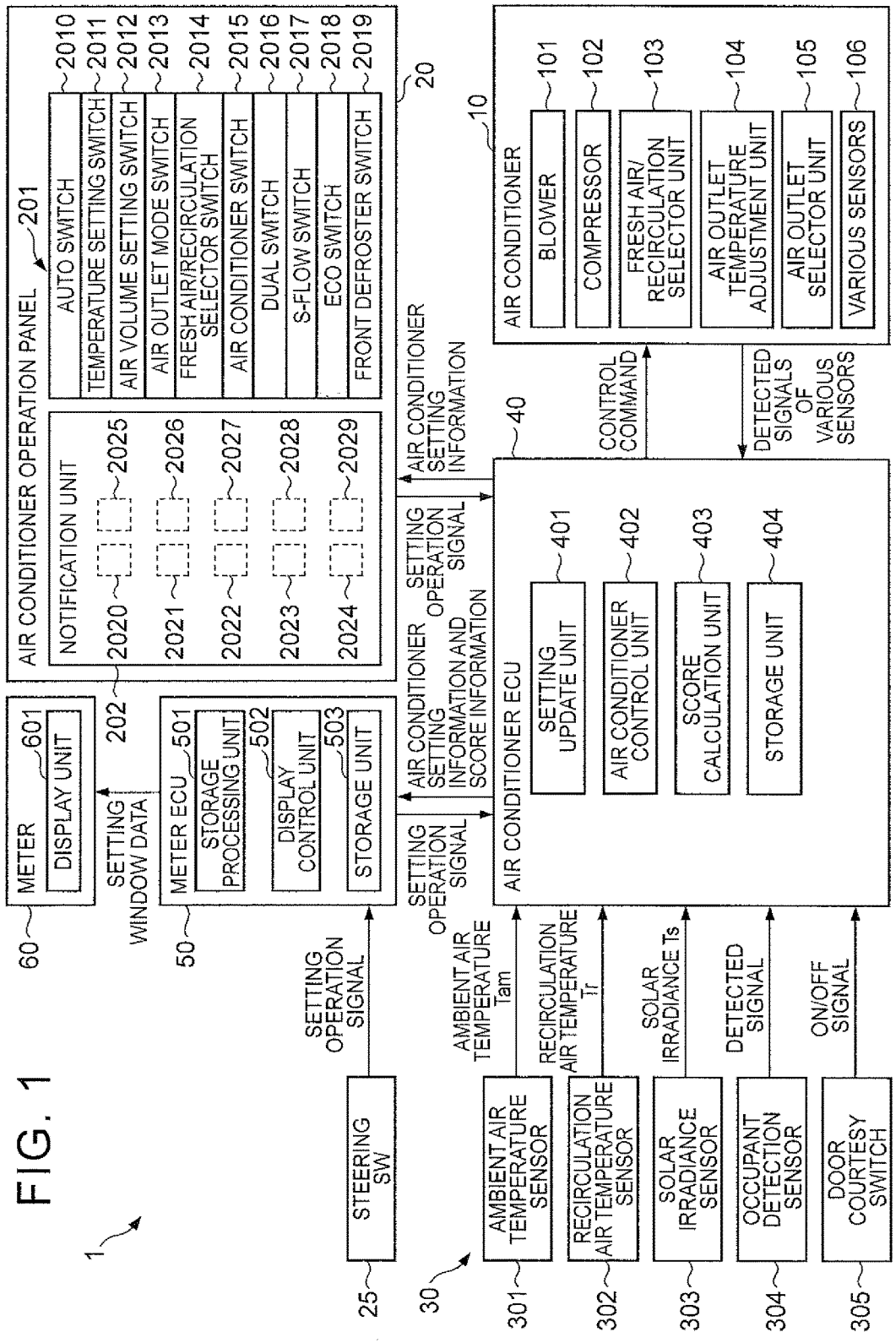
FIG. 1 is a block diagram that shows an example of the configuration of a vehicle display system.

FIG. 1 is a block diagram that schematically shows an example of the configuration of a vehicle display system 1 according to the present embodiment. The vehicle display system 1 is mounted on a vehicle, and displays settings of an air conditioner 10 of which a plurality of prescribed setting items are allowed to be set through operation of an occupant of the vehicle. Hereinafter, unless otherwise specified, the word "vehicle" means a vehicle on which the vehicle display system 1 is mounted, and the word "occupant" means an occupant of the vehicle.

The vehicle includes the air conditioner 10, an air conditioner operation panel 20, a steering switch (steering SW) 25 and a control information acquisition unit 30 as components relevant to the vehicle display system 1. The vehicle display system 1 includes an air conditioner ECU (electrical control unit) 40, a meter ECU 50 and a meter 60.

The plurality of prescribed setting items (temperature setting, air volume setting, air outlet mode setting, and the like) of the air conditioner 10 are set in response to operation of an occupant on the air conditioner operation panel 20 or operation of a driver on the steering SW 25. The air conditioner 10 adjusts the temperature in a cabin in accordance with the settings. The air conditioner 10 includes a blower 101, a compressor 102, a fresh air/recirculation selector unit 103, an air outlet temperature adjustment unit 104, an air outlet selector unit 105, and various sensors 106.

The blower 101 is an air blower. The blower 101 includes a blower fan (for example, a sirocco fan) and an electric motor. The blower 101 introduces air from the outside of the cabin or the inside of the cabin and blows the air into the cabin by driving the blower fan with the electric motor. The operating state of the blower 101 is controlled on the basis of a control command from the air conditioner ECU 40 (air conditioner control unit 402 (described later)).

The compressor 102 is arranged in an engine room of the vehicle, and constitutes a refrigeration cycle together with a condenser, an evaporator, a gas-liquid separator (which are not shown), and the like. The compressor 102 introduces, compresses and discharges refrigerant in the refrigeration cycle. Refrigerant (gas) discharged from the compressor 102 is condensed and liquefied by heat exchange with air outside the cabin at the condenser, then separated into gas and liquid by the gas-liquid separator, and supplied to the evaporator. Thus, blowing air from the blower 101, which passes through the evaporator (hereinafter, simply referred to as blowing air), is cooled by heat exchange with refrigerant inside the evaporator. In the case of a vehicle that employs an engine as a main power source, the compressor 102 operates by using the power of the engine. In the case of an electric vehicle, the compressor 102 includes an electric motor, and operates by using electric power that is supplied from a high-voltage battery that supplies electric power to a vehicle driving motor. The operating state of the compressor 102 is controlled on the basis of a control command from the air conditioner ECU 40 (air conditioner control unit 402).

The fresh air/recirculation selector unit 103 includes a fresh air/recirculation selector door and an electric motor. The fresh air/recirculation selector door is able to selectively shut off a fresh air inlet or a recirculation air inlet. The external air inlet introduces air outside the cabin (hereinafter, referred to as fresh air). The recirculation air inlet introduces air inside the cabin (hereinafter, referred to as recirculation air). The electric motor drives the fresh air/recirculation selector door. The fresh air/recirculation selector unit 103 selectively supplies fresh air or recirculation air to the blower 101 by driving the fresh air/recirculation selector door with the electric motor. The operating state of the fresh air/recirculation selector unit 103 is controlled on the basis of a control command from the air conditioner ECU 40 (air conditioner control unit 402).

The air outlet temperature adjustment unit 104 includes an air-mix door and an electric motor. The air-mix door continuously varies the ratio between draft air that is introduced into a heater core and draft air that bypasses the heater core within draft air that has passed through the evaporator. The electric motor drives the air-mix door. The air outlet temperature adjustment unit 104 adjusts the temperature of blowing air at the air outlet by driving the air-mix door with the electric motor. As will be described later, the air conditioner 10 is able to independently adjust temperature for a driver seat and temperature for a front passenger seat (independent right and left temperature adjustment), so the air conditioner 10 includes two sets of the air-mix door and the electric motor respectively for the driver seat and the front passenger seat and is able to independently operate the two sets of the air-mix door and the electric motor. The operating state of the air outlet temperature adjustment unit 104 is controlled on the basis of a control command from the air conditioner ECU 40 (air conditioner control unit 402).

The air outlet selector unit 105 includes selector doors and electric motors. Each of the selector doors switches between the open and closed states (including adjustment of opening degree) of a corresponding one of a defroster air outlet, face air outlets, foot air outlets and a rear seat air outlet. Each of the electric motors drives a corresponding one of the selector doors. The air outlet selector unit 105 is able to switch between the open and closed states of each air outlet from which air is blown toward the inside of the cabin by driving a corresponding one of the selector doors with the electric motor. The operating state of the air outlet selector unit 105 is controlled on the basis of a control command from the air conditioner ECU 40 (air conditioner control unit 402).

The defroster air outlet is provided so as to blow defroster air toward a windshield of the vehicle. The right and left two face air outlets are respectively provided for the driver seat and the front passenger seat so as to blow air toward around the faces of the occupants on the front seats. The foot air outlets are respectively provided for the driver seat and the front passenger seat so as to blow air toward the feet of the occupants on the front seats. The rear seat air outlet is provided at the distal end of a blowing air path through under the front seats (the driver seat and the front passenger seat) or under a center console between the driver seat and the front passenger seat toward the rear seat, and blows air toward occupants on the rear seat.

The various sensors 106 are sensors that detect pieces of information (various states of the air conditioner 10) that are required in order for the air conditioner ECU 40 to control the air conditioner 10. The various sensors 106 include a temperature sensor that detects the temperature of blowing air that has passed through the evaporator (evaporator outlet temperature Te), a temperature sensor that detects the coolant temperature of the heater core (engine coolant temperature Tw), and the like. Detected signals of the various sensors 106 are transmitted to the air conditioner ECU 40.

The air conditioner operation panel 20 is, for example, provided near the center of an instrument panel inside the cabin. The air conditioner operation panel 20 includes an operation unit 201 and a notification unit 202. The operation unit 201 allows a user to adjust the settings of the plurality of prescribed setting items of the air conditioner 10. The notification unit 202 notifies the user of the current settings of the setting items.

The operation unit 201 includes an auto switch 2010, a temperature setting switch 2011, an air volume setting switch 2012, an air outlet mode switch 2013, a fresh air/recirculation selector switch 2014, an air conditioner switch 2015, a DUAL switch 2016, an S-FLOW switch 2017, an ECO switch 2018 and a front defroster switch 2019. Hereinafter, description will be made with reference to FIG. 2 (which is a view that shows an example of a mode of the air conditioner operation panel 20).

Figure 2:
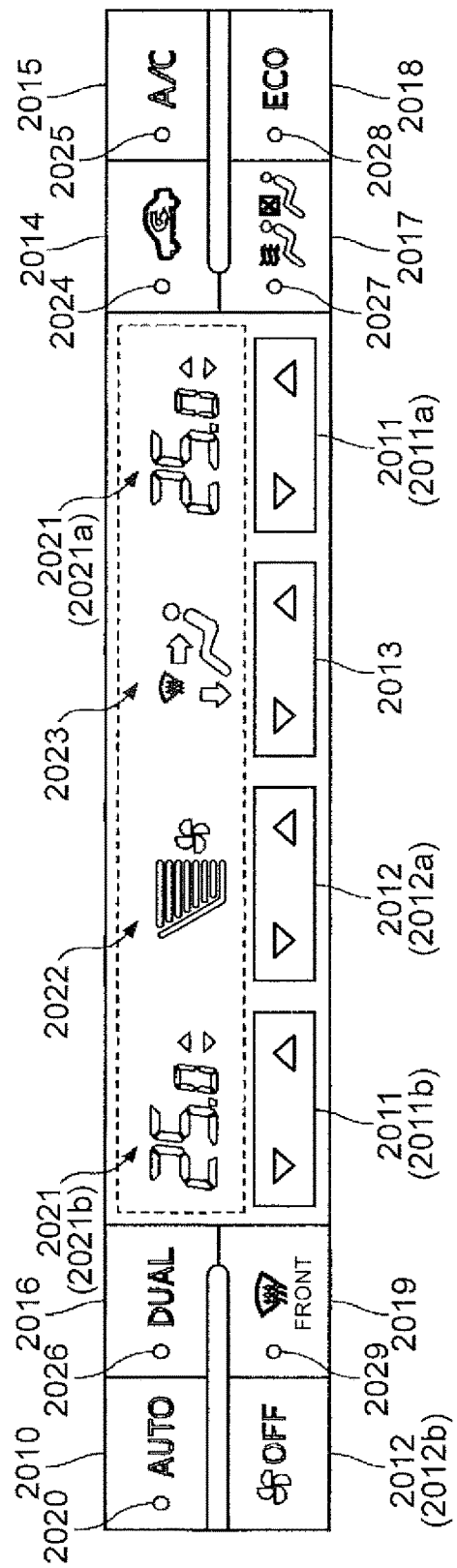
FIG. 2 is a view that shows an example of a mode of an air conditioner operation panel.

The air conditioner operation panel 20 is communicably connected to the air conditioner ECU 40 via one-to-one communication lines, and the like. Setting operation signals corresponding to setting operations of the air conditioner 10 through the switches 2010 to 2019 are transmitted to the air conditioner ECU 40. The air conditioner operation panel 20 shown in FIG. 2 is intended for a right-hand drive vehicle.

The auto switch 2010 is operation means for switching between the on and off states of automatic control (auto mode in which air volume, air outlet mode, and the like, are automatically set in response to a set temperature set by the temperature setting switch 2012) that is executed by the air conditioner ECU 40 of the air conditioner 10.

The temperature setting switch 2011 is operation means for setting the temperature inside the cabin (set temperature Tset) within a prescribed temperature range. The temperature setting switch 2011 includes two driver seat temperature setting switch 2011a and front passenger seat temperature setting switch 2011b as shown in FIG. 2 in order to perform independent right and left temperature adjustment.

The air volume setting switch 2012 is operation means for setting the air volume of the blower 101. As shown in FIG.

2, the air volume setting switch 2012 includes an air volume change switch 2012a and a blower off switch 2012b. The air volume change switch 2012a is used to turn on the blower 101 and change the air volume. The blower off switch 2012b turns off the blower 101 (sets the air volume to zero).

The air outlet mode switch 2013 is operation means for selecting a combination of the defroster air outlet, the face air outlets and foot air outlets (air outlet mode) from which air is blown. The air outlet mode, for example, includes a face mode, a bi-level mode, a foot mode, a foot defroster mode, and the like. In the face mode, the defroster air outlet and the foot air outlets are closed, the face air outlets are opened, and air is blown to the upper body of each occupant. In the bi-level mode, the defroster air outlet is closed, the face air outlets and the foot air outlets are opened, and air is blown to both the upper body and feet of each occupant. In the foot mode, the defroster air outlet and the face air outlets are closed, the foot air outlets are opened, and air is blown to the feet of each occupant. In the foot defroster mode, the face air outlets are closed, the defroster air outlet and the foot air outlets are opened, and air is blown to both the surface of the windshield and the feet of each occupant.

Irrespective of the air outlet mode, air is blown from the rear seat air outlet to the rear seat (that is, the rear seat air outlet selector door is set to an open state). An air outlet mode including the open/closed state of the rear seat air outlet may be set.

The fresh air/recirculation selector switch 2014 is operation means for changing air that is introduced by the air conditioner 10, that is, air that is introduced by the blower 101, between fresh air and recirculation air.

The air conditioner switch 2015 is operation means for switching between the on and off states of the air conditioner (the on and off states of the compressor 102).

The DUAL switch 2016 is operation means for switching between the on and off states of an independent right and left temperature adjustment function (DUAL mode).

Other than operating the DUAL switch 2016, the DUAL mode is automatically set to the on state by setting temperature with the front passenger seat temperature setting switch 2011b.

The S-FLOW switch 2017 is operation means for switching between the on and off states of a control mode in which blowing air is concentrated on a seat on which an occupant is seated (occupant concentration mode) by automatically switching between the open and closed states of each of the air outlets (the face air outlet and the foot air outlet) of the front passenger seat and the rear seat air outlet in response to whether there is an occupant on the front passenger seat and/or the rear seat.

The ECO switch 2018 is operation means for switching between the on and off states of a control mode for causing the air conditioner 10 to operate from the viewpoint of energy saving, that is, causing the air conditioner 10 to operate at a lower load (the operating load is set to a lower state), while comfortability is ensured (ECO mode). In the ECO mode, temperature setting, air volume setting, air outlet mode setting, fresh air/recirculation setting, and the like, are automatically set for balancing comfortability with energy saving of the air conditioner 10 in response to environments inside and outside the cabin (ambient air temperature, recirculation air temperature, solar irradiance), and the air conditioner 10 is controlled in accordance with the settings.

The operating load of the air conditioner 10 is motive power, electric power, or the like (power) that is externally exerted in order to operate the air conditioner 10. In other words, the operating load is an energy consumption rate that is required to operate the air conditioner 10. For example, as an electric power consumption increases in component elements (the blower 101, the electric compressor 102, and the like) that operate when supplied with electric power from an in-vehicle battery, or the like, the operating load of the air conditioner 10 increases. As an electric power consumption decreases, the operating load of the air conditioner 10 decreases. In the case where the compressor 102 operates by using the power of the engine, as a refrigerant discharge capacity that is required from the compressor 102 increases and power that is transmitted from the engine in order to drive the compressor 102 increases, the operating load of the air conditioner 10 increases; whereas, as the refrigerant discharge capacity that is required from the compressor 102 decreases and the power decreases, the operating load of the air conditioner 10 decreases.

The front defroster switch 2019 is operating means for forcibly blowing air from the defroster air outlet irrespective of the air outlet mode, that is, forcibly switching the defroster air outlet to the open state (front defroster mode). An occupant is allowed to defrost the windshield by turning on the front defroster mode to blow air from the defroster air outlet to the windshield irrespective of the air outlet mode or return to blowing air according to the air outlet mode by operating the front defroster switch 2019 to turn off the front defroster mode.

In this way, an occupant is allowed to adjust settings of the plurality of setting items (ten items), that is, on/off setting of the auto mode, temperature setting, air volume setting, air outlet mode setting, fresh air/recirculation setting, on/off setting of the air conditioner (compressor 102), on/off setting of the DUAL mode, on/off setting of the occupant concentration mode, on/off setting of the ECO mode and on/off setting of the front defroster mode.

The number of setting items of which settings are allowed to be adjusted by an occupant may be larger than or equal to ten or may be smaller than ten.

The notification unit 202 includes an auto mode setting notification unit 2020, a temperature setting notification unit 2021, an air volume setting notification unit 2022, an air outlet mode setting notification unit 2023, a fresh air/recirculation setting notification unit 2024, an air conditioner setting notification unit 2025, a DUAL mode setting notification unit 2026, an occupant concentration mode setting notification unit 2027, an ECO mode setting notification unit 2028, and a front defroster mode setting notification unit 2029. Hereinafter, description will be made with reference to FIG. 2 (which is a view that shows an example of a mode of the air conditioner operation panel 20).

The auto mode setting notification unit 2020 notifies an occupant of the setting of the on or off state (on state or off state) of automatic control (auto mode) of the air conditioner 10, which is allowed to be set with the auto switch 2010. As shown in FIG. 2, the auto mode setting notification unit 2020 is, for example, a lamp that is provided on the auto switch 2010, and notifies the setting (on or off state) of the auto mode by illuminating or not illuminating the lamp.

The temperature setting notification unit 2021 notifies an occupant of the setting of the temperature (set temperature Tset). As shown in FIG. 2, the temperature setting notification unit 2021, for example, includes a driver seat temperature setting notification unit 2021a and a front passenger seat temperature setting notification unit 2021b that are display units at both right and left ends of a liquid crystal panel (within the dashed-line box in the drawing). The driver seat temperature setting notification unit 2021a is provided at the right end of the liquid crystal panel, and displays a driver seat set temperature. The front passenger seat temperature setting notification unit 2021b is provided at the left end of the liquid crystal panel, and displays a front passenger seat set temperature.

The air volume setting notification unit 2022 notifies an occupant of the setting of the air volume (set air volume). As shown in FIG. 2, the air volume setting notification unit 2022 is a display unit at the left side of the center portion of the liquid crystal panel, and notifies the air volume through a vertical bar graph.

The air outlet mode setting notification unit 2023 notifies the setting of the air outlet mode (face mode, bi-level mode, foot mode, foot defroster mode, or the like). As shown in FIG. 2, the air outlet mode setting notification unit 2023 is a display unit at the right side of the center portion of the liquid crystal panel. The air outlet mode setting notification unit 2023 is able to display a right-pointing arrow that indicates blowing air from the face air outlets and a down-pointing arrow that indicates blowing air from the foot air outlets on an icon that figures an occupant, and is able to display a front defroster icon that indicates blowing air from the defroster air outlet (an icon of a mode in which three up-pointing curved arrows heading toward a fan shape that figures the windshield). In FIG. 2, all the display items (the right-pointing arrow, the down-pointing arrow and the front defroster icon) corresponding to all the air outlets are displayed. Actually, each display item is switched between view and hide states in response to the current air outlet mode.

The fresh air/recirculation setting notification unit 2024 notifies the setting of fresh air/recirculation (fresh air or recirculation) for air that is introduced by the air conditioner 10. As shown in FIG. 2, the fresh air/recirculation setting notification unit 2024 is a lamp that is provided on the fresh air/recirculation selector switch 2014, and notifies whether the setting is recirculation (the lamp is illuminated) or fresh air (the lamp is not illuminated) by illuminating or not illuminating the lamp.

The air conditioner setting notification unit 2025 notifies the setting of the on or off state (on state or off state) of the air conditioner (compressor 102). As shown in FIG. 2, the air conditioner setting notification unit 2025 is a lamp that is provided on the air conditioner switch 2015, and notifies the on or off state of the air conditioner (the on or off state of the compressor 102) by illuminating or not illuminating the lamp.

The DUAL mode setting notification unit 2026 notifies the setting of the on or off state (on state or off state) of the DUAL mode. As shown in FIG. 2, the DUAL mode setting notification unit 2026 is a lamp that is provided on the DUAL switch 2016, and that notifies the setting (on or off state) of the DUAL mode by illuminating or not illuminating the lamp.

The occupant concentration mode setting notification unit 2027 notifies the setting of the on or off state (on state or off state) of the occupant concentration mode. As shown in FIG. 2, the occupant concentration mode setting notification unit 2027 is a lamp that is provided on the S-FLOW switch 2017, and notifies the setting (on or off state) of the occupant concentration mode by illuminating or not illuminating the lamp.

The ECO mode setting notification unit 2028 notifies the setting of the on or off state (on state or off state) of the ECO mode. As shown in FIG. 2, the ECO mode setting notification unit 2028 is a lamp that is provided on the ECO switch 2018, and notifies the setting (on or off state) of the ECO mode by illuminating or not illuminating the lamp.

The front defroster mode setting notification unit 2029 notifies the setting of the on or off state (on state or off state) of the front defroster mode. As shown in FIG. 2, the front defroster mode setting notification unit 2029 is a lamp that is provided on the front defroster switch 2019, and notifies the setting (on or off state) of the front defroster mode by illuminating or not illuminating the lamp.

In this way, an occupant is allowed to visually recognize all the settings of the plurality of setting items (ten items), of which the settings are allowed to be adjusted with the operation unit 201, through the notification unit 202 (setting notification units 2020 to 2029) of the air conditioner operation panel 20.

Figure 3:
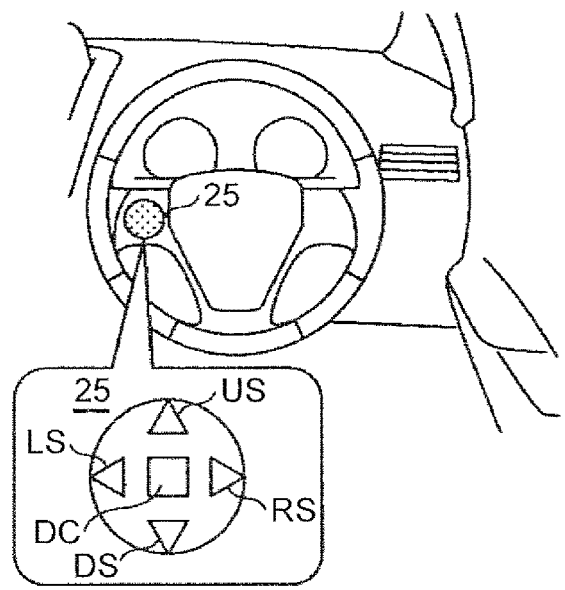
FIG. 3 is a view that shows an example of a mode of a steering switch.

The steering SW 25 is operating means for adjusting the settings of part of the setting items (specifically, temperature setting, air volume setting, fresh air/recirculation setting and on/off setting of the ECO mode) that are displayed on the setting window that is displayed in the meter 60 (display unit 601 (described later)) among the above-described plurality of setting items (ten items) relevant to the air conditioner 10. For example, as shown in FIG. 3 (which is a view that shows an example of a mode of the steering SW 25), the steering SW 25 includes an up switch US, a down switch DS, a left switch LS and a right switch RS for moving a cursor on the setting window or changing the settings of the setting items. The steering SW 25 includes an active switch DC for causing the setting window to shift into a state where the cursor is allowed to be moved with the use of the up switch US, the down switch DS, the left switch LS and the right switch RS (setting the setting window to an active state).

A setting operation signal in the case where the setting of the air conditioner 10 is adjusted with the use of the steering SW 25 is transmitted from the steering SW 25 to the meter ECU 50, and the meter ECU 50 transmits (transfers) the setting operation signal to the air conditioner ECU 40.

The control information acquisition unit 30 acquires information that is required for the air conditioner ECU 40 to control the air conditioner 10 (a state of surrounding environment, a state of the vehicle, and the like). The control information acquisition unit 30 includes an ambient air temperature sensor 301, a recirculation air temperature sensor 302, a solar irradiance sensor 303, an occupant detection sensor 304, a door courtesy switch 305, and the like.

The ambient air temperature sensor 301, the recirculation air temperature sensor 302, the solar irradiance sensor 303, the occupant detection sensor 304 and the door courtesy switch 305 are communicably connected to the air conditioner ECU 40 via one-to-one communication lines or an in-vehicle LAN, such as a controller area network (CAN).

The ambient air temperature sensor 301 is, for example, provided in the engine room, and detects the temperature outside the cabin (ambient air temperature Tam). The ambient air temperature sensor 301, for example, includes a thermistor. A detected signal of the ambient air temperature sensor 301 is transmitted to the air conditioner ECU 40.

The recirculation air temperature sensor 302 is provided in the instrument panel, and detects the temperature inside the cabin (recirculation air temperature Tr). The recirculation air temperature sensor 302, for example, includes a thermistor. A detected signal of the recirculation air temperature sensor 302 is transmitted to the air conditioner ECU 40.

The solar irradiance sensor 303 is, for example, provided on the top face of the instrument panel, and detects a solar irradiance Ts. The solar irradiance sensor 303, for example, includes a photodiode. A detected signal of the solar irradiance sensor 303 is transmitted to the air conditioner ECU 40.

The occupant detection sensor 304 is provided in the front passenger seat, and detects whether there is an occupant on the front passenger seat. The occupant detection sensor 304, for example, includes a strain gauge that is provided at a seat rail of the front passenger seat. A detected signal of the occupant detection sensor 304 is transmitted to the air conditioner ECU 40.

The door courtesy switch 305 outputs an on signal or an off signal in response to an open state or closed state of a door of the vehicle. An output signal of the door courtesy switch 305 is transmitted to the air conditioner ECU 40.

The air conditioner ECU 40 is an electronic control unit that controls the operating state of the air conditioner 10. The air conditioner ECU 40 is, for example, formed of a microcomputer, or the like, and is able to implement various control processing by executing various programs stored in a ROM on a CPU. The air conditioner ECU 40 includes a setting update unit 401, the air conditioner control unit 402 and a score calculation unit 403 as functional units that are implemented by executing one or more programs in the ROM on the CPU. The air conditioner ECU 40 includes a storage unit 404 that is implemented by a storage area defined in an internal memory.

The air conditioner ECU 40 is communicably connected to the meter ECU 50 via an in-vehicle LAN, such as a CAN.

The setting update unit 401 executes the process of updating the above-described settings of the plurality of setting items (ten items) relevant to the air conditioner 10 in response to setting operation on the air conditioner operation panel 20 (operation unit 201) or the steering SW 25. The setting update unit 401 executes the process of updating the settings of the intended setting items when the air conditioner control unit 402 automatically changes the settings of the setting items as well. Hereinafter, the process flowchart that is executed by the setting update unit 401 will be described with reference to FIG. 4.

Figure 4:
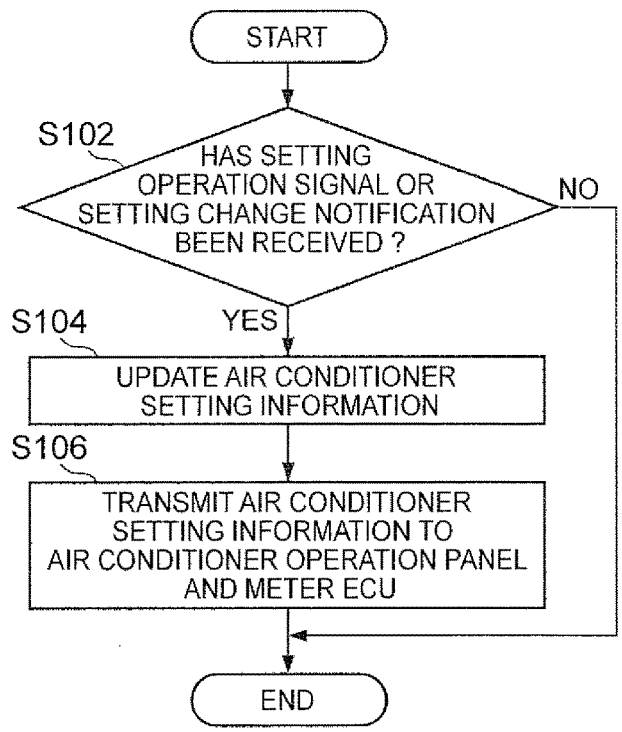
FIG. 4 is a flowchart that schematically shows an example of a setting update process that is executed by an air conditioner ECU.

FIG. 4 is a flowchart that schematically shows an example of a setting update process that is executed by the air conditioner ECU 40 (setting update unit 401). This flowchart is repeatedly executed at predetermined time intervals during a period from ignition on (IG-ON) of the vehicle to ignition off (IG-OFF).

An initial setting (setting just after IG-ON) of each setting item may, for example, take over a setting at the last IG-OFF or may be a setting (recommended setting, or the like) prescribed for each setting item. Information about the settings of the setting items in the air conditioner 10 (air conditioner setting information) is stored in the storage unit 404, and is updated through the process according to this flowchart.

In step S102, the setting update unit 401 determines whether a setting operation signal from the air conditioner operation panel 20 or the meter ECU 50 or a setting change notification from the air conditioner control unit 402 has been received. The setting operation signal is a signal that is output from the air conditioner operation panel 20 or the meter ECU 50 to the air conditioner ECU 40 at the time when settings have been adjusted with the operation unit 201 of the air conditioner operation panel 20 or the steering SW 25. The setting change notification is a notification that is output to the setting update unit 401 when the air conditioner control unit 402 automatically changes the settings of the setting items, for example, in the case where the auto mode is in the on state or the ECO mode is in the on state. When the setting update unit 401 has received the setting operation signal or the setting change notification, the process proceeds to step S104; whereas, when the setting update unit 401 has not received the setting operation signal or the setting change notification, the current process is ended.

In step S104, the setting update unit 401 updates air conditioner setting information (the settings of the intended setting items) in the storage unit 404 in response to the details of the setting operation signal (how the settings have been adjusted for which setting items) and the details of the setting change notification (how the settings are changed for which setting items).

In step S106, the setting update unit 401 transmits the updated air conditioner setting information to the air conditioner operation panel 20 and the meter ECU 50.

In step S106, the setting update unit 401 may transmit only information about the settings of the updated setting items to the air conditioner operation panel 20 and the meter ECU 50.

In this way, the setting update unit 401 updates the setting items in response to the setting operation signal that is received from the air conditioner operation panel 20 or the meter ECU 50 or the setting change notification that is received from the air conditioner control unit 402. As the updated air conditioner setting information is transmitted to the air conditioner operation panel 20 and the meter ECU 50, each of the air conditioner operation panel 20 and the meter ECU 50 is able to update the settings of the setting items that are displayed on a corresponding one of the notification unit 202 and the meter 60 (display unit 601).

Referring back to FIG. 1, the air conditioner control unit 402 executes operation control over the air conditioner 10 on the basis of the air conditioner setting information (information about the latest settings of the setting items) in the storage unit 404, information and signals that are received from the various sensors 106 and the control information acquisition unit 30.

The air conditioner control unit 402 calculates a target air outlet temperature Tao by using a known technique (such as a fitting equation based on thermal diffusion equation) on the basis of the set temperature Tset, the ambient air temperature Tam, the recirculation air temperature Tr and the solar irradiance Ts. The air conditioner control unit 402 determines a target opening degree of the air-mix door of the air outlet temperature adjustment unit 104 by using a known technique (such as a predetermined calculation formula or control map based on experiment, or the like) on the basis of the calculated target air outlet temperature Tao, and the evaporator outlet temperature Te and engine coolant temperature Tw received from the various sensors 106. The air conditioner control unit 402 transmits a control command corresponding to the determined target opening degree to the air conditioner 10 (air outlet temperature adjustment unit 104) (operation command to the electric motor that drives the air-mix door).

When the ECO mode is in the on state, the air conditioner control unit 402 determines the set temperature Tset for achieving both the energy saving of the air conditioner 10 (operation of the air conditioner 10 at a lower load) and comfortability on the basis of the ambient air temperature Tam, the recirculation air temperature Tr and the solar irradiance Ts. A technique for determining the set temperature Tset is defined in advance on the basis of experiment, simulation, or the like. The air conditioner control unit 402 calculates a target air outlet temperature Tao and a target opening degree of the air-mix door in the air outlet temperature adjustment unit 104 by using a similar technique to that described above on the basis of the determined set temperature Tset, and transmits a control command to the air conditioner 10 (air outlet temperature adjustment unit 104).

When the auto mode is in the on state or the ECO mode is in the on state, the air conditioner control unit 402 determines the setting of the air volume (and a blower motor voltage that is applied to the electric motor of the blower 101, corresponding to the setting of the air volume) by using a known technique (such as a control map based on the specifications of the blower 101, experiment, or the like) on the basis of the calculated target air outlet temperature Tao. For example, the air conditioner control unit 402 maximizes the setting of the air volume (blower motor voltage) when the target air outlet temperature Tao falls within an extremely high temperature range or an extremely low temperature range, and sets the air volume (blower motor voltage) such that the setting of the air volume (blower motor voltage) decreases as the target air outlet temperature Tao approaches from the extremely high temperature range or the extremely low temperature range to an intermediate temperature range. The air conditioner control unit 402 transmits a control command corresponding to the setting of the air volume (control command including the blower motor voltage) to the air conditioner 10 (blower 101).

On the other hand, when the auto mode is in the off state and the ECO mode is in the off state, the air conditioner control unit 402 transmits a control command corresponding to the setting of the air volume (control command including the blower motor voltage) to the air conditioner 10 (blower 101) in response to the setting (on state or off state) of the air volume in the air conditioner setting information.

When the auto mode is in the on state or the ECO mode is in the on state, the air conditioner control unit 402 determines the air outlet mode by using a known technique (such as a control map defined in advance) on the basis of the calculated target air outlet temperature Tao. For example, the air conditioner control unit 402 determines the air outlet mode such that the air outlet mode shifts in order of face mode, bi-level mode and foot mode as the target air outlet temperature Tao varies from a low temperature range to a high temperature range. The air conditioner control unit 402 transmits a control command corresponding to the determined air outlet mode (control command for achieving the open or closed state of each air outlet in the determined air outlet mode) to the air conditioner 10 (air outlet selector unit 105).

On the other hand, when the auto mode is in the off state and the ECO mode is in the off state, the air conditioner control unit 402 transmits a control command corresponding to the setting of the air outlet mode in the air conditioner setting information to the air conditioner 10 (air outlet selector unit 105).

When the auto mode is in the on state or the ECO mode is in the on state, the air conditioner control unit 402 determines the setting of fresh air/recirculation (fresh air or recirculation) by using a known technique (such as a control map defined on the basis of experiment, or the like, in advance) on the basis of the calculated target air outlet temperature Tao. For example, when the target air outlet temperature Tao falls within the extremely low temperature range or the extremely high temperature range, the air conditioner control unit 402 determines the setting to recirculation in order to improve cooling performance or heating performance; otherwise, the air conditioner control unit 402 determines the setting to fresh air. The air conditioner control unit 402 transmits a control command corresponding to the determined setting (fresh air or recirculation) to the air conditioner 10 (fresh air/recirculation selector unit 103).

On the other hand, when the auto mode is in the off state and the ECO mode is in the off state, the air conditioner control unit 402 transmits a control command corresponding to the setting (fresh air or recirculation) in the air conditioner setting information to the air conditioner 10 (fresh air/recirculation selector unit 103).

When the auto mode is in the off state and the ECO mode is in the off state, the air conditioner control unit 402 transmits a control command (on command or off command) to the compressor 102 on the basis of the setting (on state or off state) of the air conditioner (compressor 102) in the air conditioner setting information.

When the setting of the air conditioner is in the on state (including when the auto mode is in the on state or the ECO mode is in the on state), the air conditioner control unit 402 calculates a target evaporator temperature Teo by using a known technique (such as a control map based on experiment, simulation, or the like) on the basis of the calculated target air outlet temperature Tao, the ambient air temperature Tam received from the various sensors 106, and the like. The air conditioner control unit 402 compares the calculated target evaporator temperature Teo with the evaporator outlet temperature Te received from the various sensors 106, and executes operation control over the compressor 102 (transmits a control command to the compressor 102) such that the evaporator outlet temperature Te is kept at the target evaporator temperature Teo. For example, in the case of a vehicle (engine vehicle) that uses an engine as a main power source, the compressor 102 is driven by the power of the engine. For this reason, the air conditioner control unit 402 executes on/off control over the compressor 102 (on/off control over an electromagnetic clutch that is provided in a power transmission path between the compressor 102 and the engine) such that the evaporator outlet temperature Te is kept at the target evaporator temperature Teo. In the case of an engine vehicle and a variable displacement compressor 102, the air conditioner control unit 402 determines the refrigerant discharge capacity of the compressor 102 on the basis of the target evaporator temperature Teo and the evaporator outlet temperature Te, and controls a swash plate of the compressor 102 in response to the refrigerant discharge capacity. In the case of an electric compressor 102, the air conditioner control unit 402 executes operation control over the compressor 102 (electric motor) such that a rotation speed corresponding to the determined refrigerant discharge capacity is obtained.

When the auto mode is in the on state or the ECO mode is in the on state, the air conditioner control unit 402 automatically sets the setting of the air conditioner to the on state.

When the DUAL mode is in the on state, the air conditioner control unit 402 calculates a target air outlet temperature Tao of the driver seat air outlets (the face air outlet and the foot air outlet) and a target air outlet temperature Tao of the front passenger seat air outlets (the face air outlet and the foot air outlet), and executes the above-described operation control over the air conditioner 10.

When the occupant concentration mode is in the on state, the air conditioner control unit 402 executes operation control over the air conditioner 10 (air outlet selector unit 105) such that air is blown to only the front passenger seat and/or the rear seat on which it is determined that an occupant is seated and air is not blown to the front passenger seat and/or the rear seat on which no occupant is seated. When it is determined that there is no occupant on the front passenger seat, the air conditioner control unit 402 transmits a control command to the air outlet selector unit 105 such that the front passenger seat air outlets (the face air outlet and the foot air outlet) are closed. When it is determined that there is no occupant on the rear seat, the air conditioner control unit 402 transmits a control command to the air outlet selector unit 105 such that the rear seat air outlet is closed.

The air conditioner control unit 402 determines whether there is an occupant on the front passenger seat on the basis of a detected signal of the occupant detection sensor 304. The air conditioner control unit 402 determines whether there is an occupant on the rear seat on the basis of the history of an output signal of the door courtesy switch 305 for a rear seat door in a period from when the doors are unlocked before IG-ON to when the vehicle starts moving after IG-ON. This is because, when the rear seat door is opened and closed by the time the vehicle starts moving, it may be determined that an occupant is highly likely to be seated on the rear seat.

The air conditioner control unit 402 transmits a control command for opening or closing the defroster air outlet to the air conditioner 10 (air outlet selector unit 105) in response to the setting (on state or off state) of the front defroster mode in the air conditioner setting information.

When the auto mode is in the on state or the ECO mode is in the on state, as the air conditioner control unit 402 automatically changes the settings of the setting items (the settings of the set temperature, air volume, fresh air/recirculation, and air outlet mode), the air conditioner control unit 402 transmits a setting update notification to the setting update unit 401.

The score calculation unit 403 calculates an energy saving evaluation score (an example of an index value that indicates the level of the operating load of the air conditioner 10; hereinafter, simply referred to as score) for evaluating the degree of energy saving of the air conditioner 10 (the level of the operating load of the air conditioner 10) on the basis of the air conditioner setting information (the latest settings of the setting items in the air conditioner 10) in the storage unit 404. This is because a load state of the air conditioner 10 (the state of operating load, such as electric power consumption of the above-described blower 101, and the like, and power that is loaded from the engine on the compressor 102), that is, energy that is consumed by the air conditioner 10 (energy consumption rate), varies in response to the settings of the setting items. Hereinafter, the process flowchart that is executed by the score calculation unit 403 will be described with reference to FIG. 5.

Figure 5:
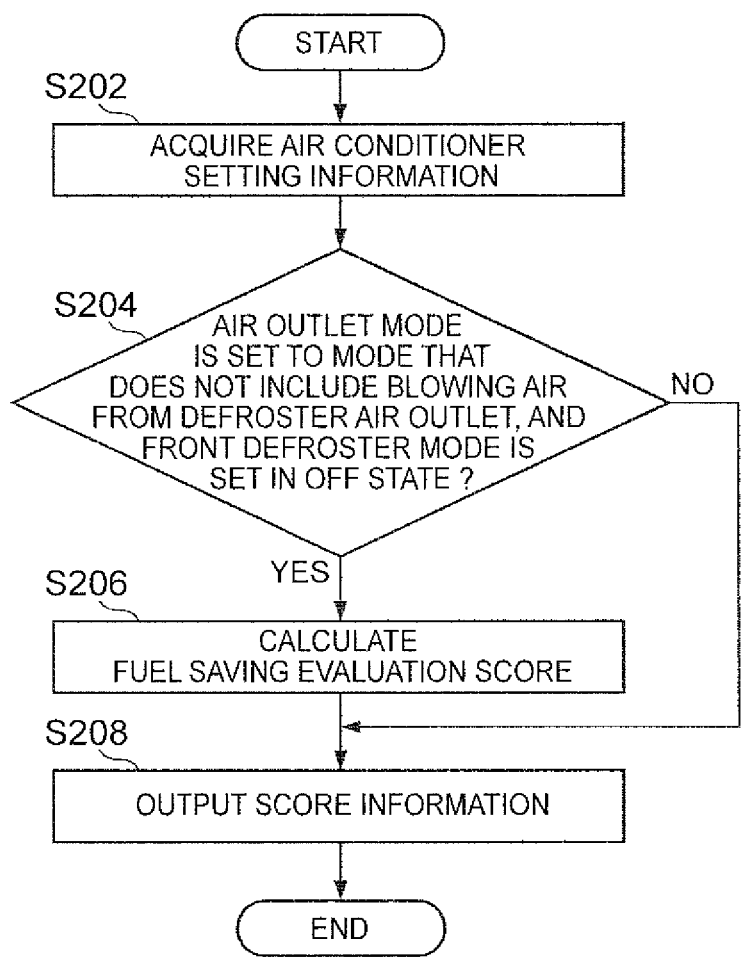
FIG. 5 is a flowchart that schematically shows an example of an energy savings evaluation score output process that is executed by the air conditioner ECU.

FIG. 5 is a flowchart that schematically shows an example of an energy saving evaluation score output process that is executed by the air conditioner ECU 40 (score calculation unit 403). The process according to this flowchart is repeatedly executed at predetermined time intervals during a period from the IG-ON of the vehicle to the IG-OFF.

In step S202, the score calculation unit 403 acquires the air conditioner setting information (the latest settings of the setting items of the air conditioner 10) that is stored in the storage unit 404.

In step S204, the score calculation unit 403 determines whether the set air outlet mode is the air outlet mode that does not include blowing air from the defroster air outlet (for example, a mode other than the foot defroster mode, or the like) and the front defroster mode is set in the off state. When the set air outlet mode is the air outlet mode that does not include blowing air from the defroster air outlet and the front defroster mode is set in the off state, the score calculation unit 403 proceeds to step S206; otherwise, the score calculation unit 403 proceeds to step S208 and does not calculate the score. As will be described later, the score calculated by the score calculation unit 403 is displayed on the meter 60 (display unit 601). This is to avoid, for example, a situation in which the fogging of the windshield is not reduced as a result of prompting setting operation for stopping blowing air from the defroster air outlet at the time of deterioration of the score due to the start of blowing air from the defroster air outlet.

In step S206, the score calculation unit 403 calculates the score on the basis of the acquired air conditioner setting information.

The setting items of which the settings influence the load state (the state of operating load) of the air conditioner 10 among the above-described plurality of setting items (ten items) are six items, that is, temperature setting, air volume setting, fresh air/recirculation setting, the on or off state of the air conditioner (compressor 102), the on or off state of the occupant concentration mode and the on or off state of the ECO mode. For this reason, specifically, the score calculation unit 403 calculates a score S within the range of 0 to 100 points on the basis of the settings of the six items.

The setting items that influence the load state of the air conditioner 10 are items that causes the load state of the air conditioner 10 to vary in a steady state after the change of the settings with respect to the load state before the change of the settings. That is, the setting items that influence the load state of the air conditioner 10 do not include the one that causes the load state to vary in a transitional state at the time when the settings are changed (for example, like the set air outlet mode, the one that causes the load of the air conditioner 10 to temporarily increase as a result of operation of the air outlet selector unit 105 when the setting has been changed). As the set temperature has been changed, when the occupant concentration mode is in the on state, air is not blown to the seat on which there is no occupant, and it is possible to concentrate blowing air on the seat on which there is an occupant. For this reason, it is possible to reduce the flow rate of air that is blown by the blower 101 as compared to when air is blown to all the seats, so, even with the same set temperature, set air volume, and the like, it is possible to achieve energy saving of the air conditioner 10 by reducing the operating load of the air conditioner 10. When the ECO mode is in the on state, while the ambient air temperature Tam, the recirculation air temperature Tr and the solar irradiance Ts are monitored in real time, the set temperature Tset that achieves both energy saving of the air conditioner 10 and comfortability is set each time. Therefore, as compared to when the temperature is set manually including the case where the auto mode is in the on state, it is possible to achieve energy saving of the air conditioner 10 by reducing the operating load of the air conditioner 10.

Initially, the score calculation unit 403, for example, calculates scores (a score S1 for temperature setting, a score S2 for air volume setting, a score S3 for fresh air/recirculation setting, a score S4 for the on or off state of the air conditioner, a score S5 for the on or off state of the occupant concentration mode and a score S6 for the on or off state of the ECO mode) out of 100 for six items.

As for temperature setting, when the target air outlet temperature Tao calculated by the air conditioner control unit 402 falls within the intermediate temperature range, the operating load of the air conditioner 10 (the electric power consumption of the blower 101, or the like, power that is loaded on the compressor 102, and the like) is relatively low, and the operating load of the air conditioner 10 increases as the calculated target air outlet temperature Tao approaches the extremely high temperature range or the extremely low temperature range. For this reason, for example, where the case in which the target air outlet temperature Tao falls within the predetermined intermediate temperature range is set to 100 points, the score calculation unit 403 calculates the score S1 for temperature setting such that the points decrease as the target air outlet temperature Tao leaves from the above range and approaches the extremely high temperature range or the extremely low temperature range.

As for air volume setting, the operating load (electric power consumption) of the air conditioner 10 (blower 101) tends to reduce as the air volume reduces. For this reason, for example, where the case in which the air volume is smaller than or equal to a predetermined threshold is set to 100 points, the score calculation unit 403 calculates the score S2 for air volume setting such that the points decrease as the set air volume increases away from the predetermined threshold. The predetermined threshold corresponding to the situation that the score S2 is 100 points may be varied in response to the target air outlet temperature Tao.

As for fresh air/recirculation setting, when the ambient air temperature Tam is extremely high or extremely low, high cooling performance or high heating performance is required, so recirculation setting is more efficient. That is, it is possible to converge the temperature inside the cabin to the set temperature Tset earlier than in the case of fresh air setting, so it is possible to reduce the operating load of the air conditioner 10. For this reason, for example, when the ambient air temperature Tam falls within the extremely high temperature range or the extremely low temperature range, the score calculation unit 403 sets the score S3 for fresh air/recirculation setting to 100 points in the case of recirculation setting, and sets the score S3 for fresh air/recirculation setting to 0 points in the case of fresh air setting. When the ambient air temperature Tam does not fall within the extremely high temperature range or the extremely low temperature range, the score calculation unit 403 sets the score S3 for fresh air/recirculation setting to 100 points even in the case of recirculation setting or fresh air setting because the ambient air temperature Tam does not significantly influence the load state of the air conditioner 10 even in the case of recirculation setting or fresh air setting.

As for the on or off state of the air conditioner, when the air conditioner is set in the on state, as the refrigerant discharge capacity that is determined by the air conditioner control unit 402 increases, the operating load of the compressor 102 (power that is loaded on the compressor 102) increases, with the result that the energy consumption rate of the air conditioner 10 (compressor 102) increases. For this reason, for example, where the case in which the refrigerant discharge capacity determined by the air conditioner control unit 402 is lower than or equal to a predetermined threshold is set to 100 points, the score calculation unit 403 calculates the score S4 for the on or off state of the air conditioner such that the points are decreased as the determined refrigerant discharge capacity increases away from the predetermined threshold. When the air conditioner is in the off state, the compressor 100 does not operate, so the score calculation unit 403 sets the score S3 to 100 points.

As for the on or off state of the occupant concentration mode, as described above, the operating load of the air conditioner 10 is reduced when the occupant concentration mode is in the on state, so it is possible to achieve energy saving of the air conditioner 10. For this reason, for example, the score calculation unit 403 sets the score S5 for the on or off state of the occupant concentration mode to 100 points when the occupant concentration mode is in the on state, and sets the score S5 for the on or off state of the occupant concentration mode to 0 points when the occupant concentration mode is in the off state.

As for the on or off state of the ECO mode, as described above, when the ECO mode is in the on state, the operating load of the air conditioner 10 is reduced, so it is possible to achieve energy saving of the air conditioner 10. For this reason, for example, the score calculation unit 403 sets the score S6 for the on or off state of the ECO mode to 100 points when the ECO mode is in the on state, and sets the score S6 for the on or off state of the ECO mode to 0 points when the ECO mode is in the off state.

As the score calculation unit 403 calculates the scores S1 to S6, the score calculation unit 403 calculates the sum of the scores S1 to S6 respectively multiplied by coefficients K1 to K6 as a score S as expressed by the mathematical expression (1).

$$S = K1 \cdot S1 + K2 \cdot S2 + K3 \cdot S3 + K4 \cdot S4 + K5 \cdot S5 + K6 \cdot S6 \quad (1)$$

Each of the coefficients K1 to K6 is a value larger than 0 and smaller than 1, and the coefficients K1 to K6 are defined in advance such that the score S takes a value between 0 to 100. The magnitude relation among the coefficients K1 to K6 is determined as needed in consideration of, for example, how much the settings of the six items influence the operating load of the air conditioner 10 (energy saving of the air conditioner 10).

In step S208, the score calculation unit 403 transmits score information, including the score S calculated in step S206, to the meter ECU 50 when the score calculation unit 403 has passed through step S206, or transmits score information, indicating that the score has not been calculated, to the meter ECU 50 when the score calculation unit 403 has not passed through step S206, and then ends the current process.

Referring back to FIG. 1, the meter ECU 50 is an electronic control unit that controls display of the meter 60 (notification means for displaying the vehicle speed, fuel level, travel distance, shift position, and the like, of the vehicle and notifying them to a driver). The meter ECU 50 executes the process of transferring the setting operation signal of the air conditioner 10, which is input from the steering SW 25, to the air conditioner ECU 40. The meter ECU 50 is, for example, formed of a microcomputer, or the like, and implements various control processing by executing various programs stored in a ROM on a CPU. The meter ECU 50 includes a storage processing unit 501 and a display control unit 502 as functional units that are implemented by one or more programs stored in the ROM. The meter ECU 50 includes a storage unit 503 that is implemented by a storage area on an internal memory.

The storage processing unit 501 executes the process of storing the air conditioner setting information and score information received from the air conditioner ECU 40 (the setting update unit 401 and the score calculation unit 403) in the storage unit 503. As the storage processing unit 501 receives the air conditioner setting information from the air conditioner ECU 40 (setting update unit 401), the air conditioner setting information stored in the storage unit 503 (the air conditioner setting information received from the air conditioner ECU 40 last time) is updated with the newly received air conditioner setting information and stored. Thus, the air conditioner setting information stored in the storage unit 503 is constantly kept in the latest condition to which the air conditioner setting information has been updated by the air conditioner ECU 40 (setting update unit 401). As the storage processing unit 501 receives the score information from the air conditioner ECU 40 (score calculation unit 403), the newly received score information is stored in the storage unit 503 while old score information received from the air conditioner ECU 40 last time or before is kept as a history.

The display control unit 502 executes the process of displaying the setting window of the air conditioner 10 on the display unit 601 of the meter 60 on the basis of the air conditioner setting information and score information (latest score information), stored in the storage unit 503. The setting window is a window for the driver to perform setting operations of the air conditioner 10 (operations for changing the settings of the setting items) through operation on the steering SW 25. Hereinafter, the process flowchart that is executed by the display control unit 502 will be described with reference to FIG. 6.

Figure 6:
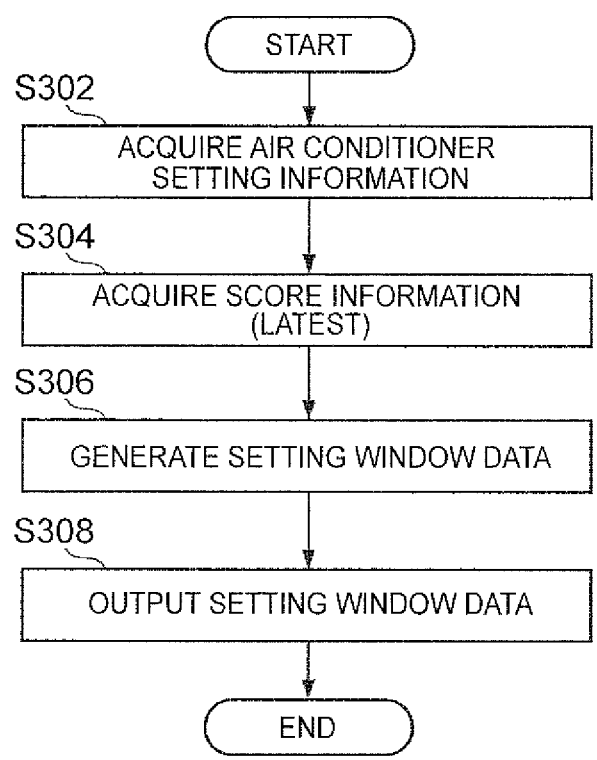
FIG. 6 is a flowchart that schematically shows an example of a setting window display process that is executed by a meter ECU (display control unit)

FIG. 6 is a flowchart that schematically shows an example of a setting window display process that is executed by the meter ECU 50 (display control unit 502). The process according to this flowchart is repeatedly executed at predetermined time intervals during a period from the IG-ON of the vehicle to the IG-OFF.

In step S302, the display control unit 502 acquires the air conditioner setting information (the latest air conditioner setting information received from the air conditioner ECU 40) from the storage unit 503.

In step S304, the display control unit 502 acquires the latest score information from the storage unit 503.

In step S306, the display control unit 502 generates the image data of the setting window (setting window data) of the air conditioner 10 on the basis of the acquired air conditioner setting information and score information.

In step S308, the display control unit 502 outputs the generated setting window data to the meter 60, causes the display unit 601 to display the setting window, and then ends the current process.

Next, the details of the setting window that the meter ECU 50 (display control unit 502) causes the meter 60 (display unit 601) to display will be described with reference to FIG. 7 and FIG. 8.

Figure 7:
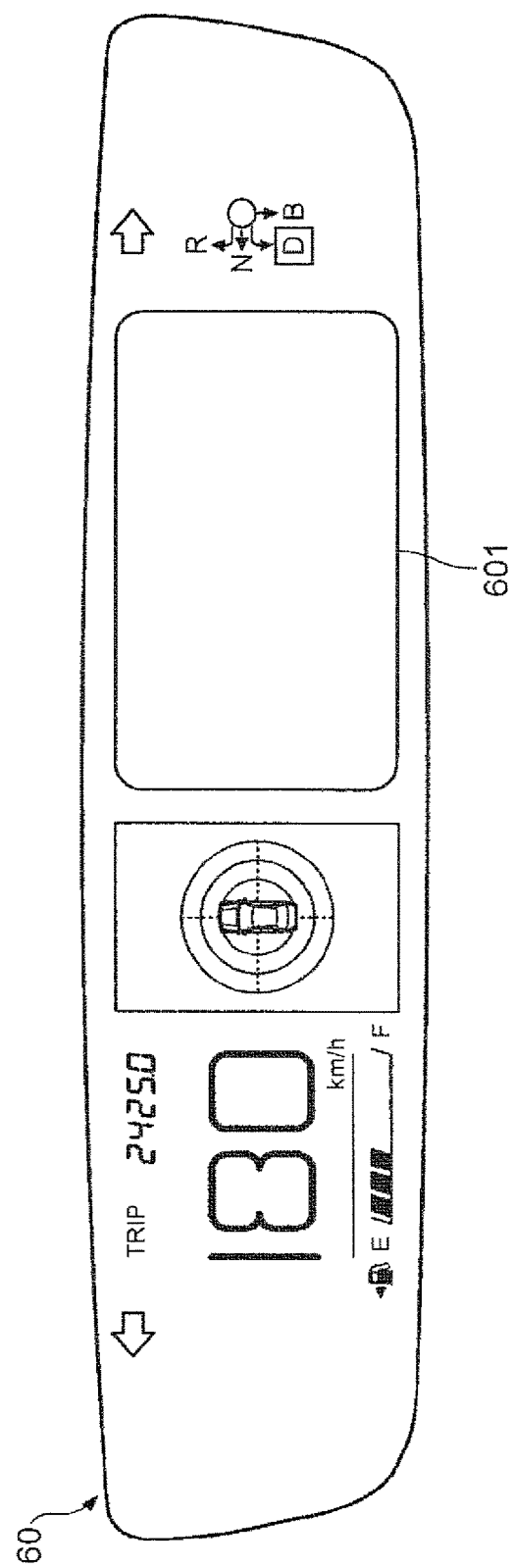
FIG. 7 is a view that shows an example of a mode of a meter and a display unit within the meter.

FIG. 7 is a view that shows an example of a mode of the meter 60 and the display unit 601 within the meter 60. FIG. 8 is a view that shows an example of the setting window of the air conditioner 10, which is displayed on the display unit 601.

As shown in FIG. 7, the vehicle speed, the travel distance, the fuel level, and the like, are displayed at the left-side portion of the meter 60, the shift position is displayed at the right end of the meter 60, and the display unit 601 is provided near the center in the meter 60.

The meter 60 shown in FIG. 7 is assumed mainly for a left-hand drive vehicle. In the case of a right-hand drive vehicle, the positions of the display contents in the meter 60 may be inverted horizontally. That is, the vehicle speed, the travel distance, the fuel level, and the like, are displayed at the right-side portion of the meter 60, and the shift position is displayed at the left end of the meter 60.

Figure 8:
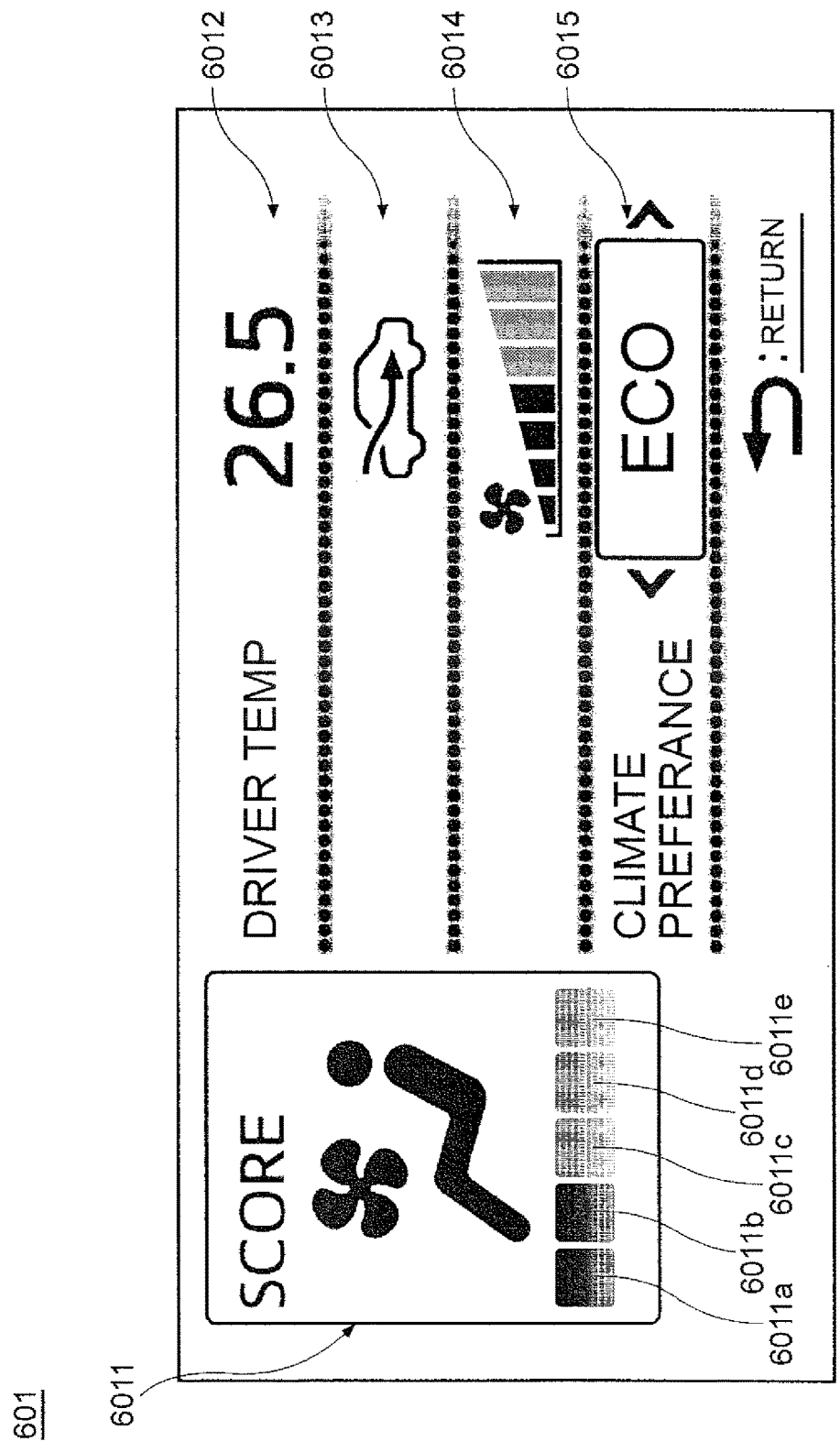
FIG. 8 is a view that shows an example of a setting window for an air conditioner, which is displayed on the display unit.

As shown in FIG. 8, the setting window of the air conditioner 10, which is displayed on the display unit 601 by the display control unit 502, contains a score indicator 6011, a set temperature indicator 6012, a fresh air/recirculation setting indicator 6013, a set air volume indicator 6014 and an ECO mode setting indicator 6015.

The score indicator 6011 is displayed in about one-third area at the left side (left-side area) of the display unit 601. The score indicator 6011 contains the text "SCORE", the icon of a wind mill representing the air conditioner 10, the icon representing an occupant in a seated state, and a bar graph. The text "SCORE" is displayed at the upper end. The wind mill icon and the seated occupant icon are displayed at the center portion below the text. The bar graph is displayed at the lower end below the icons, and indicates the score S (the latest score S calculated by the score calculation unit 403). The bar graph indicates the score S (the range of points) by how many blocks are bright from the left side among five blocks 6011a to 6011e arranged in the horizontal direction and each representing one tick. For example, when only the left-end block 6011a is bright, it indicates that the score S is larger than or equal to 0 points and smaller than 30 points. When the two blocks 6011a, 6011b from the left are bright, it indicates that the score S is larger than or equal to 30 points and smaller than 50 points. When the three blocks 6011a to 6011c from the left are bright, it indicates that the score S is larger than or equal to 50 points and smaller than 70 points. When the four blocks 6011a to 6011d from the left are bright, it indicates that the score S is larger than or equal to 70 points and smaller than 90 points. When all the five blocks 6011a to 6011e from the left are bright, it indicates that the score S is larger than or equal to 90 points and smaller than or equal to 100 points.

When the latest score information acquired in step S304 of FIG. 6 indicates that the score has not been calculated, the score S is not indicated (for example, only the bar graph may be hidden or all the components in the score indicator 6011 may be hidden). The score indicator 6011 may directly indicate the numeric value of the score S. A mean score Sm may be indicated on the score indicator 6011 on the basis of the history of the score information, which is stored in the storage unit 503. The mean score Sm is a mean value of the score S to present time (for example, a mean value of the score S from the most recent IG-ON to present time, a mean value of the score S in all the past time, or the like). The latest score S and the mean score Sm may be selectively indicated on the score indicator 6011 (for example, a mode in which the latest score S is indicated and a mode in which the mean score Sm is indicated are switched by predetermined operation on the steering SW 25).

The setting indicators 6012 to 6015 are displayed in about two-thirds area at the right-side (right-side area) of the display unit 601. The setting indicators 6012 to 6015 are displayed sequentially from top down in the above area.

The set temperature indicator 6012 is displayed at the upper end in the right-side area of the display unit 601, and indicates the setting of the temperature (when the DUAL mode is in the on state, the setting of the driver seat temperature) among the plurality of setting items (ten items) of the air conditioner 10. In the example shown in FIG. 8, "26.5"(° C.) is indicated as the setting of the temperature.

The fresh air/recirculation setting indicator 6013 is indicated below the set temperature indicator 6012 in the right-side area of the display unit 601, and indicates the setting of fresh air/recirculation among the plurality of setting items (ten items) of the air conditioner 10. In the example shown in FIG. 8, the icon that indicates fresh air setting is displayed, and it indicates that the setting is fresh air setting.

In the case of recirculation setting, a similar icon to the pattern drawn on the fresh air/recirculation selector switch 2014 shown in FIG. 2 is displayed.

The set air volume indicator 6014 is displayed below the fresh air/recirculation setting indicator 6013 in the right-side area of the display unit 601, and indicates the setting of the air volume among the plurality of setting items (ten items) of the air conditioner 10. In the example shown in FIG. 8, four blocks from the left are bright within a bar graph in which seven blocks each corresponding to one tick are arranged from the left to the right, and it indicates that the setting of the air volume is the fourth stage out of seven stages.

The ECO mode setting indicator 6015 is arranged below the set air volume indicator 6014 in the right-side area of the display unit 601, and indicates the setting of the on or off state of the ECO mode among the plurality of setting items (ten items) of the air conditioner 10. In the example shown in FIG. 8, the text "ECO" is displayed, and it indicates that the ECO mode is in the on state.

When the ECO mode is in the off state, for example, the text "NORMAL" is displayed.

The setting items (temperature setting, fresh air/recirculation setting, air volume setting and the on or off state of the ECO mode) of the setting indicators 6012 to 6015 are setting items that influence the load state of the air conditioner 10 as described above, and are setting items that are used to calculate the score S.

The display control unit 502 may display the settings of other setting items (the on or off state of the air conditioner (compressor 102) and the on or off state of the occupant concentration mode) that influence the load state of the air conditioner 10 on the display unit 601 in addition to the setting indicators 6012 to 6015 or in place of part or all of the setting indicators 6012 to 6015.

A cursor (not shown) that is allowed to be moved vertically through operation on the steering SW 25 (the up switch US and the down switch DS) is overlappingly displayed on any one of the setting indicators 6012 to 6015. The driver is allowed to set the setting window, which is displayed on the display unit 601, to the active state by depressing the active switch DC of the steering SW 25, as described above. As the setting window of the display unit 601 shifts into the active state, the driver is allowed to select a desired setting item by moving the cursor among the setting indicators 6012 to 6015 with the use of the up switch US and down switch DS of the steering SW 25. The driver is allowed to adjust the setting of the setting item (change the setting) corresponding to any one of the setting indicators 6012 to 6015, to which the cursor points, with the use of the left switch LS and the right switch RS. For example, after the driver sets the setting window to the active state through operation on the active switch DC, the driver is allowed to change the setting of the temperature by depressing the left switch LS or the right switch RS in a state where the cursor points to the set temperature indicator 6012. The driver is allowed to decrease the set temperature Tset in 0.5° C. each time the driver depresses the left switch LS within a prescribed temperature range, and the driver is allowed to increase the set temperature Tset in 0.5° C. each time the driver depresses the right switch RS.

The display control unit 502 shifts the setting window into the active state on the basis of an operation signal that corresponds to operation of the active switch DC and that is input from the steering SW 25. The display control unit 502 overlappingly displays the cursor on any one of the setting indicators 6012 to 6015, and moves the cursor (displays the cursor while changing the location of the cursor) on the basis of an operation signal corresponding to operation of the up switch US or down switch DS, which is input from the steering SW 25. As the operation signal corresponding to operation of the left switch LS or right switch RS is input from the steering SW 25, the display control unit 502 recognizes the setting operation signal, and transfers the setting operation signal to the air conditioner ECU 40 as described above. As the display control unit 502 receives the air conditioner setting information from the air conditioner ECU 40, the display control unit 502 approves setting operation on the steering SW 25, and updates the setting of the setting item, which corresponds to any one of the setting indicators 6012 to 6015 and of which the setting has been adjusted.

In this way, the display control unit 502 displays the score S on the display unit 601. The score S is an index value that indicates the level of the operating load of the air conditioner 10 (the degree of energy saving of the air conditioner 10). For this reason, a user (an occupant of the vehicle) is allowed to recognize how much the operating load of the air conditioner 10 can be reduced by changing the settings of the setting items of the air conditioner 10. The display control unit 502 displays the settings of the setting items that are used to calculate the score S on the display unit 601 among the plurality of setting items (ten items) of the air conditioner 10 together with the score S. For this reason, the user is allowed to recognize which setting items contribute to a reduction of the operating load. Therefore, with the vehicle display system 1 according to the present embodiment, it is possible to prompt the user to appropriately adjust settings for operating the air conditioner 10 at a lower load.

The display unit 601 on which the display control unit 502 displays the setting window of the air conditioner 10 is arranged at a location within the cabin, different from the air conditioner operation panel 20 including the operation unit 201 and the notification unit 202. The operation unit 201 is used to adjust the settings of the plurality of setting items (ten items). The notification unit 202 notifies the occupant of all the settings of the plurality of setting items. Therefore, according to the present embodiment, the user is allowed to easily recognize that the setting items that are displayed on the display unit 601 are associated with the score S, that is, the setting items influence the load state of the air conditioner 10.

The display unit 601 on which the display control unit 502 displays the setting window of the air conditioner 10 is arranged within the meter 60. Therefore, according to the present embodiment, the user is allowed to easily recognize a variation in the score S in the case where the settings of the setting items that are displayed on the display unit 601 are changed, so the user easily appropriately adjust settings for causing the air conditioner 10 to operate at a lower load.

On the setting window that the display control unit 502 causes the display unit 601 to display, it is allowed to perform operation for changing the settings of the setting items corresponding to the setting indicators 6012 to 6015 (air conditioner setting operation) with the use of the steering SW 25. That is, the driver is allowed to change only the settings of the setting items that influence the load state of the air conditioner 10 and that are displayed on the display unit 601 among the plurality of setting items (ten items) of the air conditioner 10 with the use of the steering SW 25, so the user is allowed to easily reduce the operating load of the air conditioner 10 by changing the settings of the setting items of the air conditioner 10.

The embodiment of the disclosure is described in detail above; however, the disclosure is not limited to the specific embodiment. Various modifications and changes are applicable.

For example, in the above-described embodiment, the display unit 601 on which the display control unit 502 displays the setting window is provided within the meter 60. Instead, as long as a location is easily visually recognized by a driver, the display unit 601 may be provided at any location within the cabin.

In the above aspect of the embodiment, the display unit may be arranged at a location inside the cabin different from an air conditioner operation panel, the air conditioner operation panel including an operation unit and a notification unit, the operation unit being used to adjust the settings of the plurality of setting items, and the notification unit notifying an occupant of all the settings of the plurality of setting items.

According to the above aspect of the embodiment, the display unit is arranged separately at a location inside the cabin, different from the air conditioner operation panel including the operation unit that is used to adjust the settings of the air conditioner and the notification unit that notifies the user of all the settings of the plurality of setting items, so the user is allowed to easily recognize that the setting item that is displayed on the display unit is associated with the index value, that is, the setting item influences the load state of the air conditioner.

In the above aspect of the embodiment, the display unit may be arranged within a meter.

According to the above aspect of the embodiment, the display unit is arranged within the meter, so the user is allowed to easily recognize a variation in the index value in the case where the setting of the setting item that is displayed on the display unit has been changed. Therefore, the user is allowed to easily appropriately adjust settings for causing the air conditioner to operate at a lower load.

In the above aspect of the embodiment, the vehicle display system may further include a setting update unit wherein the display control unit may be configured to change the setting of the setting item that is displayed on the display unit in response to a setting operation signal that is input from a steering switch, and the setting update unit may be configured to change the setting of the air conditioner, corresponding to the setting item changed in response to the setting operation signal.

According to the above aspect of the embodiment, it is possible to provide a vehicle display system that is able to prompt a user to appropriately adjust settings for causing the air conditioner to operate at a lower load.

What is claimed is:

1. A vehicle display system comprising:
   a display arranged in a cabin of a vehicle and configured to display settings of a plurality of setting items of an air conditioner, the plurality of setting items including multiple setting items that influence a load state of the air conditioner; and
   an electronic control unit configured to:
      calculate a plurality of index values, each of the plurality of index values indicating a level of an operating load of the air conditioner for one of the multiple setting items,
      display, on the display, a value calculated based on the plurality of index values and the settings of the multiple setting items, and
      not display, on the display, the value calculated based on the plurality of index values and the settings of the multiple setting items when a defroster item of the multiple items is set so that air blows out from the air outlet of the defroster.

2. The vehicle display system according to claim 1, wherein
   the display is arranged at a location inside the cabin different from an air conditioner operation panel, the air conditioner operation panel being used to adjust the settings of the plurality of setting items and notifying an occupant of all the settings of the plurality of setting items.

3. The vehicle display system according to claim 2, wherein the display is arranged within a meter.

4. The vehicle display system according to claim 3, wherein
   the electronic control unit is configured to
      change one of the settings of the multiple setting items that are displayed on the display in response to a setting operation signal that is input from a steering switch, and
      change a setting of the air conditioner, corresponding to the setting item changed in response to the setting operation signal.

5. The vehicle display system according to claim 1, wherein the electronic control unit is configured to calculate the value by determining a plurality of products by multiplying each of the plurality of index values by a corresponding predetermined coefficient and determining a sum of the plurality of products.

* * * * *